(12) United States Patent
Hernandez

(10) Patent No.: US 8,375,031 B2
(45) Date of Patent: Feb. 12, 2013

(54) LOSSLESS REAL-TIME LINE-RATE FILTERING USING PCAP STYLE FILTERS AND HARDWARE ASSISTED PATRICIA TREES

(75) Inventor: Alina Hernandez, Wylie, TX (US)

(73) Assignee: Tektronix, Inc., Beaverton, OR (US)

( * ) Notice: Subject to any disclaimer, the term of this patent is extended or adjusted under 35 U.S.C. 154(b) by 16 days.

(21) Appl. No.: 13/024,707

(22) Filed: Feb. 10, 2011

(65) Prior Publication Data

US 2012/0209862 A1 Aug. 16, 2012

(51) Int. Cl.
*G06F 7/00* (2006.01)
*G06F 17/30* (2006.01)

(52) U.S. Cl. ........ 707/736; 707/754; 707/755; 715/234; 715/242

(58) Field of Classification Search .................... 709/219
See application file for complete search history.

(56) References Cited

U.S. PATENT DOCUMENTS

| | | | |
|---|---|---|---|
| 6,120,552 A | 9/2000 | Kurtzberg et al. | |
| 7,551,629 B2 * | 6/2009 | Chen et al. | 370/401 |
| 7,636,697 B1 * | 12/2009 | Dobson et al. | 706/12 |
| 2004/0001498 A1 * | 1/2004 | Chen et al. | 370/401 |
| 2005/0022115 A1 * | 1/2005 | Baumgartner et al. | 715/513 |
| 2006/0010193 A1 | 1/2006 | Sikdar et al. | |
| 2007/0022414 A1 | 1/2007 | Bird | |
| 2007/0112805 A1 * | 5/2007 | Heuer et al. | 707/100 |
| 2008/0091409 A1 | 4/2008 | Anderson | |
| 2009/0006447 A1 * | 1/2009 | Balmin et al. | 707/102 |

OTHER PUBLICATIONS

Bittner et al, "The Arbitrary Boolean Publish/Subscribe Model: Making the Case" Jun. 20-22, 2007, ACM; pp. 226-237.*
Jiang et al, "Efficient Processing of XML Twig Queries with OR-Predicates", Jun. 13-18, 2004; ACM, pp. 1-12.*
European Patent Office, "partial European Search Report," EPO Application No. 12150771-9, Sep. 26, 2012, (6 pages).

* cited by examiner

*Primary Examiner* — Angelica Ruiz
(74) *Attorney, Agent, or Firm* — Fogarty, L.L.C.

(57) ABSTRACT

A processor performs line-rate filtering using hardware-assisted Patricia trees. A PCAP-style filter is converted into a form that can be inserted into a Patricia tree. The PCAP filter expression is parsed and converted into disjunctive normal form (DNF). Each DNF clause of the filter is inserted into a Patricia tree. The DNF clauses are checked for overlaps and the overlapping clauses are combined when possible.

9 Claims, 2 Drawing Sheets

F(R0)=R0==0 AND R1==0 AND R4==17 AND (R6==X OR R7==X) AND R8==Y

| STEP | OP | V | INPUT | ACTION | |
|---|---|---|---|---|---|
| 1 | EMPTY | EMPTY | R0==0 AND R1==0 AND R4==17 | SHIFT | ⌐301 |
| 2 | EMPTY | R0==0 | AND R1==0 AND R4==17 | SHIFT | ⌐302 |
| 3 | AND | R0==0 | R1==0 AND R4==17 | SHIFT | ⌐303 |
| 4 | AND | R1==0 R0==0 | AND R4==17 | REDUCE | ⌐304 |
| 5 | EMPTY | (R1==0 AND R0==0) | AND R4==17 | SHIFT | ⌐305 |
| 6 | AND | (R1==0 AND R0==0) | R4==17 | SHIFT | ⌐306 |
| 7 | AND | R4==17 (R1==0 AND R0==0) | EMPTY | REDUCE | ⌐307 |
| 8 | EMPTY | R4==17 AND (R1==0 AND R0==0) | EMPTY | ACCEPT | ⌐308 |

*FIG. 3*

LOSSLESS REAL-TIME LINE-RATE FILTERING USING PCAP STYLE FILTERS AND HARDWARE ASSISTED PATRICIA TREES

BACKGROUND

Packet capture (PCAP) filters are commonly used in packet data networks to extract portions of live data traffic that are of interest to a user for further examination. This filter style is preferred in many cases due to its flexibility in terms of filter specification. Typical implementations of PCAP filters convert the expression into some form of a Berkeley packet filter (BPF). However, when monitoring high-bandwidth networks on the order of 10 Gbps or greater, it is almost impossible to apply a BPF without randomly dropping packets that match the filter.

SUMMARY

Specialized processors exist today that allow applications to perform line-rate filtering using hardware-assisted Patricia trees. The architecture of the processor itself guarantees that the Patricia trees can be searched at line-rate. However PCAP style filters cannot be inserted into a Patricia without modifications. The methods and systems disclosed herein explain how to convert a PCAP style filter into a form that can be inserted into a Patricia tree. This allows specialized hardware, such as the NP-X line of processors from EZchip Technologies, to perform lossless filtering at rates as high as 40 Gbps.

In one embodiment, a filter expression for a PCAP-like filter is parsed and converted into a disjunctive normal form (DNF). Each conjunctive clause of a filter in DNF can be inserted into a Patricia tree. However hardware-assisted Patricia trees have certain limitations that must be considered. First, processors that can search these trees at line rate typically don't do any type of reassembly. Therefore the fields to use for filtering are typically in layers 2 through 4 of the OSI model. An exception is made when information from the upper layers can be obtained from information in the lower layers, for example some L7 protocols use well known transport addresses. In this case, the L7 protocol could be used for filtering since it can be derived from the transport information in layers 3 and 4. Second, entries for the trees must be defined in advance therefore this filter cannot be applied to any random byte in the packet. Third, the keys for the trees have a limited size (38 Bytes in the case of the NPX line of processors). Fourth, these trees return a first match when a search is performed that matches multiple entries, in other words, they don't support overlapping filters. Overcoming the third and fourth limitations requires special manipulation of the filter expression and limits the number of filters that can be inserted into the tree.

BRIEF DESCRIPTION OF THE DRAWINGS

Figure 1:
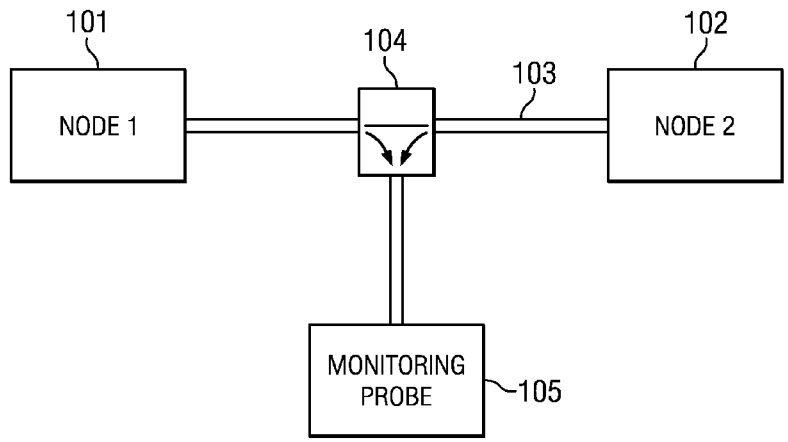
Figure 2:
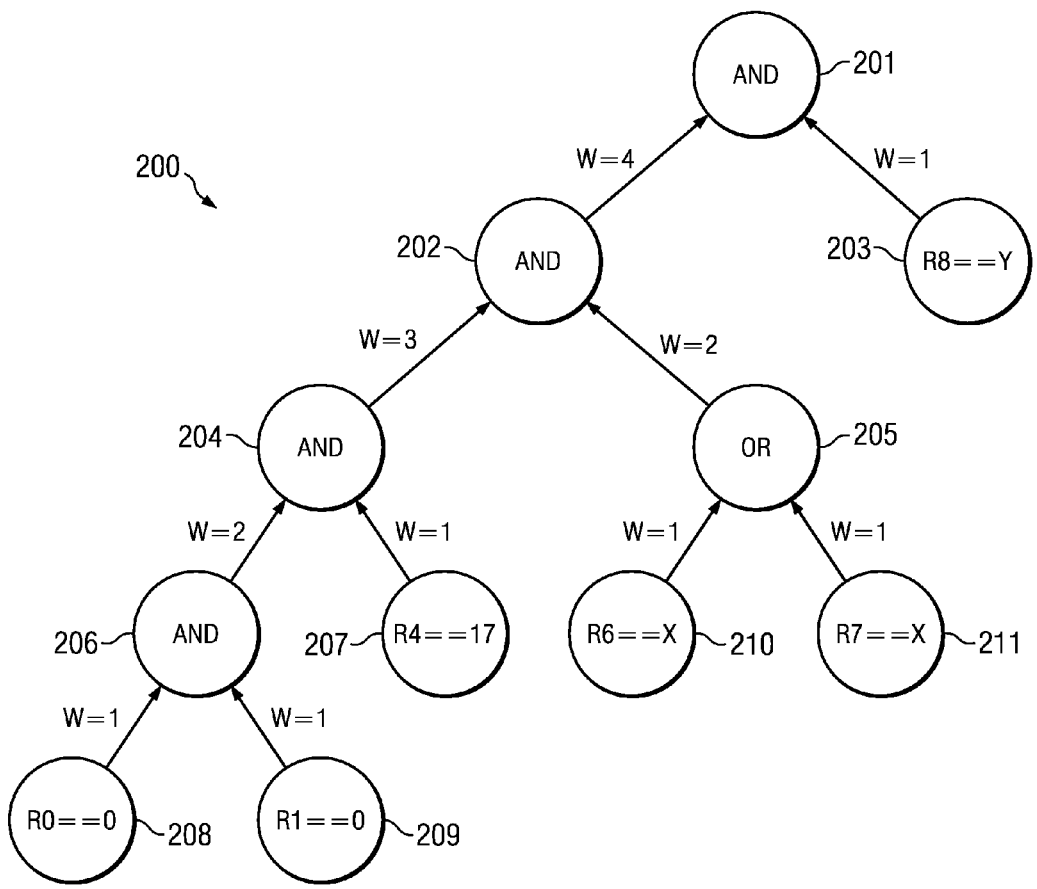

Having thus described the invention in general terms, reference will now be made to the accompanying drawings, wherein:

FIG. 1 is a high-level block diagram illustrating a system for capturing and filtering packets in a communication network;

FIG. 2 is an exemplary representation of a filter in binary tree form; and

FIG. 3 illustrates a process for using the parser decision table to generate a filter tree.

DETAILED DESCRIPTION

The invention now will be described more fully hereinafter with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. One skilled in the art may be able to use the various embodiments of the invention.

FIG. 1 is a high-level block diagram illustrating a system for capturing and filtering packets in a communication network. Network nodes 101 and 102 are coupled via interface 103. Network traffic, such as data packets, are passed between nodes 101 and 102 over interface 103. Filter 104 passively captures data packets from interface 103 and passes the packets to monitoring device 105. Monitoring device 105 may be associated with a protocol analyzer, network monitor, packet sniffer, or network tester, for example. The captured data packets may be displayed to a user and/or used for network troubleshooting, protocol analysis, or software development.

Filter 104 may be a processor such as the NP-X line of processors from EZchip Technologies. A user may define a filter expression to be used to identify the data packets carried on interface 103 that should be provided to monitoring device 105. The filter expression may include a number of data packet parameters, such as source/destination addresses and/or ports, virtual local area network (VLAN) identifier, and/or the IP protocol, version or type of service (TOS). These parameters may be compared to variables using relational and/or logical operators. However, the actual capabilities of filter 104 may not match the elements required in the filter expression. For example, filter 104 may be designed to use a particular group of relational or logical operators. The filter expression must be modified to remove any relational or logical operators that cannot be processed by filter 104.

Filter 104 captures IP data packets from interface 103 in real time. In order to process the data packets in real-time, the filter 104 must operate at 40 Gpbs or higher line speeds. Patricia trees can be used to process the captured data at such high speeds. However, the filter hardware may require certain limitations on the format of the filter expression. The user-provided filter expression must be adapted to match the filter hardware and the Patricia format. For example, in some embodiments, the filter hardware may support only AND relationships between filter terms. The user-provided filter expression must be converted to meet this limitation. Embodiments described herein are directed to an application that breaks down the filter expression and applies the filter expression to a Patricia tree to enable the filter to operate at line speeds without dropping packets.

In one embodiment, the filter expression is converted to a binary tree data structure comprising leaf nodes representing relational operations that provide inputs to other nodes that represent logical operations. The binary tree is then converted to a disjunctive normal form in which the only relational expressions are AND operations. In the conversion to disjunctive normal form, multiple filter entries are created from the original filter expression. The multiple filters create overlaps in which certain data packets would match two or more filters. The intersection of conjunctive clauses in different filters must be identified and then added to the binary tree as a separate conjunctive clause.

Sample Filter Specification

In one embodiment, filters support the fields listed in TABLE 1. The filters support the relational operators:

>(greater than), <(less than), >=(greater than or equal to), <=(less than or equal to), ==(equal to), and !=(not equal to); and the logical operators: AND, OR, and NOT. The maximum number of filter instances supported per interface card is four, and the minimum number of terms per filter instance is 32.

TABLE 1

| FIELD | BITS |
| --- | --- |
| Physical port | 4 |
| Ethernet protocol | 4 |
| VLAN ID 1 | 12 |
| VLAN ID 2 | 12 |
| IP version | 4 |
| IP protocol | 8 |
| IP TOS | 8 |
| Source IP address | 128 |
| Destination IP address | 128 |
| Source L4 port | 16 |
| Destination L4 port | 16 |

Hardware Assisted Patricia Tree Specification

TABLE 2 illustrates sniffer complex tree entry for a hardware assisted Patricia tree.

TABLE 2

| KEY | BITS | SRAM OR DRAM |
| --- | --- | --- |
| Physical Port | 4 | DRAM |
| L2 type | 4 | DRAM |
| VLAN ID 1 | 12 | DRAM |
| VLAN ID 2 | 12 | DRAM |
| IP version | 4 | DRAM |
| IP protocol | 8 | DRAM |
| IP TOS | 8 | DRAM |
| Source IP | 128 | DRAM |
| Destination IP | 128 | DRAM |
| Source port | 16 | DRAM |
| Destination port | 16 | DRAM |

| RESULT | BITS | SRAM OR DRAM |
| --- | --- | --- |
| Filter information | 96 | DRAM |

Parsing the Filter String to Generate a Binary Tree Representation of the Filter In an example embodiment, a filter expression supports ten filtering fields. The filter expression is provided as a string and has the characteristics shown in TABLE 3. The filtering fields are referenced R0 through R9.

TABLE 3

| FIELD | DESCRIPTION |
| --- | --- |
| R0 | physical port |
| R1 | Ethernet protocol (e.g. IP (0), ARP (1), RARP (2), or wildcard (0xffffffff)) |
| R2 | VLAN1 |
| R3 | IP version |
| R4 | IP protocol |
| R5 | IP TOS |
| R6 | Source IP |
| R7 | Destination IP |
| R8 | Source L4 port |
| R9 | Destination L4 port |

The filter expression supports the relational operators (>, <, >=, <=, ==, and !=), binary logical operators (AND, and OR), and the unary logical operator NOT. Additionally, the filter expression supports the parenthetical operators: "(",")". In the filter expression, precedence is left to right, or as indicated by parenthesis. Relational operators have a higher precedence than logical operators, and all logical operators have the same precedence. In this example, the maximum number of filter instances per interface board is 16, and the minimum number of operators per filter instance is 16.

Using the parameters defined above, an example filtering string may be defined as:

F[P]=R0==0 AND R1==0 AND R4==17 AND (R6==3232240995 OR R7==3232240995) AND R8==9201.

It will be understood that the filter expression illustrated herein is provided merely as an exemplary implementation. One of ordinary skill in the art will further understand that different implementations of the same concepts may be used. For example, the filter representation of TABLES 1 and 2 are not the form required to be provided to the user application, but are provided as an example. A developer must define a filter syntax in agreement with the appropriate application. The filter syntax used in this document is a viable option. However, in a real-world application, the field tokens (R0 through R9) may be replaced with string tokens that are more descriptive of the fields represented. The limitations described in this section are the suggested limitations that are deemed acceptable and would allow sniffer filtering to meet the performance requirements. A developer would be free to increase the number of filter instances or filter terms per instance as long as the performance requirements described herein are met.

The filter expression, such as the example filter string defined above, may be parsed to generate a binary tree representation of the filter. FIG. 2 is an exemplary representation of a binary tree. The tree 200 comprises a number of nodes 201-211. In one embodiment, the binary tree has the following characteristics. Each node 201-211 in the tree has either two children (e.g. 201-206) or no children (e.g. 207-211). Each node in the tree is mapped to a relational or logical operator in the filter instance other than the NOT operator. Accordingly, in the example embodiment, the maximum number of nodes in a tree is sixteen. All nodes with no children are referred to as leaf nodes (207-211) and contain a relational operation between a filter field (i.e. fields R0-R9) and a 32-bit constant. The leaf nodes 207-211 have no inputs.

All nodes with two children (201-206) contain a binary logical operation (e.g. AND or OR). The inputs to the binary logical operation are the results provided from the children of the node. Each node produces a result that serves as input to its parent node, with the exception of the root node 201 which provides a final result. All nodes comprise an indication to whether or not the final result from the node should be negated before it is passed as input to a parent node. This indication represents the NOT operation. Pointers to the children of each node should carry a weight (W) that indicates the distance from that node to the furthest leaf node.

Sample Structure for the Filter Expression Tree Nodes

TABLE 4 illustrates an example structure (struct FilterExpNode) for the filter expression of the tree nodes.

TABLE 4

| PARAMETER | COMMENT |
| --- | --- |
| struct FilterExpNode { unsigned int not: 1; | // NOT indicator applied to result of operation |

TABLE 4-continued

| PARAMETER | COMMENT |
|---|---|
| unsigned int operator: 7; | // Operator |
| unsigned int pc: 8; | // Position of this operation in program |
| unsigned int input: 8; | // Input field for relational operators only |
| unsigned int wRight: 4 | // Weight of right path |
| unsigned int wLeft: 4; | // Weight of left path |
| unsigned int k; | // 32-bit constant for relational operators only |
| FilterExpNode *pRight; | // Pointer to left child node |
| FilterExpNode *pLeft; | // Pointer to right child node |
| FilterExpNode *pParent; | // Pointer to parent node |
| }; | |

Different formats may be used for the node structure in other embodiments. For example, in order to support IPv6 addresses, either two 64-bit constants or four 32-bit constants (k) are required in the node structure.

The following outlines a process for generating a binary tree that represents the filter expression. The input to the process is an expression to be parsed.

First, codes are defined for all operators and filter variables. For example, TABLE 5 illustrates example operation codes and TABLE 6 illustrates example filter variable codes for use in a filter expression parser application.

TABLE 5

| OPERATOR | CODE |
|---|---|
| < | 0 |
| > | 1 |
| <= | 2 |
| >= | 3 |
| == | 4 |
| != | 5 |
| ( | 6 |
| ) | 7 |
| AND | 8 |
| OR | 9 |
| NOT | 10 |

TABLE 6

| FILTER VARIABLE | CODE |
|---|---|
| R0 | 0 |
| R1 | 1 |
| R2 | 2 |
| R3 | 3 |
| R4 | 4 |
| R5 | 5 |
| R6 | 6 |
| R7 | 7 |
| R8 | 8 |
| R9 | 9 |

Next, two stacks are defined—one operator stack (OP) and one value stack (V). The operator stack holds binary logical operators, and the value stack holds pointers to a filter expression tree. Initially, both stacks are empty.

Then, the expression is parsed from left to right, one element at a time. An "element" may be a value or an operator. As noted above, in one embodiment, the valid operators are AND, OR, NOT, "(", and ")". The valid values are a relational expression in the form of a filter node or the result of combined logical and relational expressions in the form of a filter tree. The final result will be contained by the value stack in the form of a filter tree that represents the whole filter expression.

A bi-dimensional decision table is defined to describe the action to be taken as a function of the input operator (i.e. the next element in the filter expression) and the operator at the top of the OP stack. The possible actions in the decision table are: SHIFT, REDUCE, and ACCEPT. For SHIFT, the next element from the filter expression is added to the OP stack. For REDUCE, one operation is popped from the stack to obtain the operation to apply to one element, in the case of NOT, or to apply to two elements, in the case of AND or OR. The elements are obtained from the value stack. The result of the operation is reinserted into the value stack. For ACCEPT, the final tree is removed from the value stack. TABLE 7 illustrates an exemplary decision table used by the parser application according to one embodiment.

TABLE 7

| | INPUT | | | | | |
|---|---|---|---|---|---|---|
| OP | AND | OR | NOT | ( | ) | EMPTY |
| AND | REDUCE | REDUCE | SHIFT | SHIFT | REDUCE | REDUCE |
| OR | REDUCE | REDUCE | SHIFT | SHIFT | REDUCE | REDUCE |
| NOT | REDUCE | REDUCE | REDUCE | SHIFT | REDUCE | REDUCE |
| ( | SHIFT | SHIFT | SHIFT | SHIFT | POP ( | ERROR |
| ) | ERROR | ERROR | ERROR | ERROR | ERROR | ERROR |
| EMPTY | SHIFT | SHIFT | SHIFT | SHIFT | ERROR | ACCEPT |

When a '(' operator sits at the top of the stack, and the input operator is a ')', the operator stack is reduced by doing a "pop" to remove the '(' operator. Therefore, the ')' operator will never be inserted to the stack.

When the expression is being parsed, the parsing units are either operators (AND, OR, NOT, "(", or ")") or values of the form:

[field] [relational operator (>, <, >=, <=, ==, or !=)] [constant].

The entire relational operation is considered to be a value. Values are always pushed onto the value stack in the form of a pointer to a filter expression node. When a node is allocated to be inserted into the value stack the fields in TABLE 4 are initialized as follows:
pFilterExpNode->not=0;
pFilterExpNode->operator=code for operation;
pFilterExpNode->pc=0;
pFilterExpNode->input=code for R0->R9, extracted from relational expr.;
pFilterExpNode->wRight=0;
pFilterExpNode->wLeft=0;
pFilterExpNode->k=32-bit constant extracted from relational expression;
pFilterExpNode->pRight=NULL;
pFilterExpNode->pLeft=NULL; and
pFilterExpNode->pParent=NULL.

When the stacks are reduced, the value nodes are combined follows:

If the operator in the OP stack is a NOT, the operator is popped and one value node is popped. The "not" field of the value node is set to "1", and the value node is pushed onto the value stack.

If the operator in the OP stack is an AND or an OR, the operator is popped and a node must be allocated and initialized as described above. Additionally, two value nodes are popped. One value node becomes the right child of the new node, and the other one value node becomes the left child of the new node. The parent pointer of the children nodes must be updated to point to the new node. Finally, the weights (W)

of the parent node must be adjusted, and the pointer is pushed onto the value stack. The weights are adjusted as follows:

The parser algorithm continues processing all elements of the filter expression as described above until the operator stack is empty and the end of the filter expression has been reached. At that point, the value stack is "popped" in order to retrieve the pointer to the filter expression tree.

FIG. 3 illustrates a process for using the parser decision table to generate a filter tree. For example, using the input filter string:

F=R0==0 AND R1==0 AND R4==17, the parser application processes the input expression to generate the corresponding filter tree.

In step 301, the operator (OP) stack and the value (V) stack are both empty, and the parser application receives the input string. The action taken is SHIFT in which the next (i.e. the first) element of the filter expression is added to the V stack. In step 302, the OP stack is still empty, but the V stack now holds the first filter element: R==0. The input holds the remainder of the filter expression (i.e. AND R1==0 AND R4==17). Again, the action is SHIFT and the next element of the filter expression is added to a stack. In this case, the next action is an operator (AND). So, in step 303, the AND operator is added to the OP stack and the V stack holds the first filter element: R==0. The input holds the remainder of the filter expression. Again the action is SHIFT to add the next element of the filter expression to a stack.

In step 304, the OP stack still holds the AND operator, and the next filter element (R1==0) is added to the top of the V stack. The input holds the remainder of the filter expression. The action taken is REDUCE because the next element of the filter expression is an "AND" operator. This is consistent with the decision table (TABLE 7). The REDUCE operation requires that the two elements in the V stack are "popped" and the AND operation is applied to those elements.

In step 305, the OP stack is now empty, because the AND operation has been applied following step 304. The V stack comprises the expression "(R1==0 and R2==0)" and the input comprises the remainder of the filter expression. According to the decision table, the appropriate action is SHIFT when the OP stack is empty and the next element is the AND operator.

In step 306, the AND operator is added to the OP stack, the V stack holds the "(R1==0 and R2==0)" expression, and the input holds the remainder of the filter expression (R4==17). The action is SHIFT. In step 307, the filter element (R4==17) is added to the V stack, which leaves the input empty. As a result, the action is REDUCE. Therefore, in step 308, the top two elements in the V stack are "popped" and the AND operator is applied. The resulting final tree: R4==7 AND (R1==0 AND R0==0) can then be removed from the V stack.

Conversion of Sniffer Filters to Disjunctive Normal Form

In order to take advantage of the filtering power of the hardware assisted Patricia trees, the filter expression should be converted to Disjunctive Normal Form (DNF). In one embodiment, the sniffer filters are inserted into a binary complex tree. A binary complex tree is a tree that is able to define a set of complex rules per entry, in addition to the binary and ternary (binary+wildcard) formats used by traditional binary Patricia trees.

Complex entries are inserted into the complex tree as a series of fields, where each field is defined by the following parameters:

Size of the field (in bits);
Field type;
One or two values according to the field's type; and
Endiannes.

The field type may be:

Normal: Field represents a binary key and mask;
Any: Field represents all values within the field's range (wildcard);
Equals: Value of the field is equal to a single specified value;
Not-equals: Field represents any value with the exception of a single specified value;
Range: Field represents all values within a specified range;
Greater-than: Field represents all values above a specified boundary; or
Less-than: Field represents all values below a specified boundary.

Complex trees are defined as regular binary Patricia trees. An API may be used to convert complex entries into one or more binary or ternary entries. Therefore, a single complex entry can generate many simple entries.

All the fields in a binary tree entry are tied together by the logical AND operator, while different entries within the same tree are tied together by the logical OR operator. Therefore, in order to be able to insert a sniffer filter into a complex tree, the filter expression must be converted to DNF form. The disjunctive normal form is a normalization of a logical formula which is a disjunction of conjunctive clauses. In other words, in the context of sniffer filters, each conjunctive clause would represent a set of fields associated by the logical operator AND, while each conjunctive clause is associated to zero or more conjunctive clauses by the logical operator OR.

For example, the filer expression used in the example of FIG. 1 can be converted to DNF form as illustrated below. The original filter expression:

F[P]=R0==0 AND R1==0 AND R4==17 AND (R6==3232240995 OR R7==3232240995) AND R8==9201 can be expressed in DNF form:

F[P]=(R0==0 AND R1==0 AND R4==17 AND R6==3232240995 AND R8==9201) OR (R0==0 AND R1==0 AND R4==17 AND R7==3232240995 AND R8==9201).

All conjunctive clauses that result from converting the filter expression to DNF can be inserted into the complex tree as individual entries. From the example above, one can see that a single sniffer filter can result in many complex tree entries.

Another useful analogy is to think of sniffer filters as algebraic formulas where the AND operator represent multiplication and the OR operator represent addition. Given the associative property of multiplication, the following rules apply:

$(x+y)*z=x*z+y*z$, for all x,y,z in A
$x*(y+z)=x*y+x*z$, for all x,y,z in A
$a*(x*y)=(a*x)*y=x*(a*y)$, for all a,x,y in A The starting point to convert a sniffer filter expression to DNF is the graphical representation of the filter that is obtained in the parsing phase as described above. Starting with the graphical representation of the filter, the following additional steps must be taken:

Remove all NOT operators from the tree. A post-order tree walk is required for this purpose. This type of tree walk allows each node to be processed before its parent node is processed. To traverse the binary tree in post-order, the following operations are performed recursively at each node: traverse the left sub-tree, traverse the right sub-tree, and visit the root. Once a node is found with a NOT operator bit set, both sub-trees of the node, as well as the node itself must be negated by applying the rules in TABLE 8.

TABLE 8

| OPERATION | RESULT |
|---|---|
| NOT (A AND B) | NOT(A) OR NOT(B) |
| NOT (A OR B) | NOT(A) AND NOT(B) |
| NOT (A == K) | A != K |
| NOT (A != K) | A == K |
| NOT (A > K) | A <= K |
| NOT (A <= K) | A > K |
| NOT (A < K) | A >= K |
| NOT (A >= K) | A < K |

The following Pseudo-code illustrates a process for removing the NOT operators from the tree.

```
RemoveNotFromTree(pFilterExpNode, negate)
{
    if(!pFilterExpNode)
        return;
    if(pFIlterExpNode->pRight==NULL)
    {
        if(pFilterExpNode->not==1 || negate==1)
        {
            pFilterExpNode->not=0;
            // Convert opCode using TABLE 8
            NegateOpCode(pFilterExpNode);
        }
        return;
    }
    RemoveNotFromTree(pFilterExpNode->pLeft, negate);
    RemoveNotFromTree(pFilterExpNode->pRight, negate);
    if(pFilterExpNode->not==1 || negate==1)
    {
        negate = 1;
        pFilterExpNode->not = 0;
        // Convert opCode using TABLE 8
        NegateOpCode(pFilterExpNode);
        RemoveNotFromTree(pFilterExpNode->pLeft, negate);
        RemoveNotFromTree(pFilterExpNode->pRight, negate);
        negate = 0;
    }
}
```

Once all the NOT operators have been removed, the filter tree can be used to obtain all conjunctive clauses that represent a complex tree entry. Using the following algorithm:

Step 1: Define four linked lists: L (left sub-tree), R (right sub-tree), RL (result of left sub-tree), and RR (result of right sub-tree). These four linked lists will be used to store the resulting conjunctive clauses as the tree is traversed. Each node in the linked list should contain the following information:

Based on the complex tree operators:

```
enum ComplexEntryOp
{
    Any = 0,
    Equals,
    NotEquals,
    Range,
    GreaterThan,
    LessThan,
    MAX_COMPLEX_ENTRY_OP
};
```

Based on TABLE 1, order follows order of fields in complex tree entry:

```
enum ComplexEntryFields
{
    PhysicalPort = 0,
    L2Type,
    Vlan1,
    Vlan2,
    IpVersion,
    IpProtocol,
    IpTos,
    SourceIp,
    DestinationIp,
    SourcePort,
    DestinationPort,
    MAX_COMPLEX_ENTRY_FIELDS
};
```

A single term is represented in a complex entry as follows:

```
struct ComplexEntryTerm
{
    ComplexEntryOp operator;
    unsigned int    value1[4];
    unsigned int    value2[4];
};
```

All terms in a complex entry, linked by the AND operation are represented as follows:

```
struct ComplexEntryNode
{
    ComplexEntryTerm terms[MAX_COMPLEX_ENTRY_FIELDS];
    ComplexEntryNode * pNext;
    ComplexEntryNode * pPrev;
};
```

Step 2: Perform a post-order tree walk as outlined below:
1) If a leaf node is processed, allocate a complex tree entry node that contains the operation and insert it in L if the node is in the left sub-tree or R if the node is in the right sub-tree.
2) If a non-leaf node is processed:
   A) If the node contains an OR operation and its children are leaf nodes, move all nodes from R and L into RL if the node is a left child, or RR if the node is a right child.
   B) If the node contains an OR operation and its children are not leaf nodes, move all nodes from RR and RL into RL if the node is a left child, or RR if the node is a right child.
   C) If the node contains an AND operation and its children are leaf nodes, every node in R must be combined with every node in L to create a single conjunctive clause. All resulting entries must be inserted into RR if the node is a right child, or RL if the node is a left child. An additional temporary list will be required for this purpose.
3) Once the root node is processed, all resulting nodes will contain the filter expression in DNF. The root node can be considered a left child for purpose of the algorithm which means RL will contain all resulting nodes.

The following Pseudo-code illustrates a process for generating a DNF tree:

```
ComplexEntryList L, R, RL, RR;
ComputeOrOfComplexEntryLists( pL1, pL2)
{
    // Move all nodes from pL2 to pL1
```

-continued

```
    InsertComplexEntryList( pL1, pL2);
}
ComputeAndOfComplexEntryLists( pL1, pL2)
{
    ComplexEntryList T;
    ComplexEntryNode *pI, *pJ;
    for(pI=CEListGetFirst(pL1); pI!=NULL; pI=CEListGetNext(pL1, pI))
        for(pJ=CEListGetFirst(pL2); pJ!=NULL;
        pJ=CEListGetNext(pL2, pJ))
        {
            ComplexEntryNode * pNode;
            pNode = ComputeAndOfTerms( pI, pJ);
            InsertComplexEntryNode( T, pNode);
        }
    ResetComplexEntryList(pL1);
    ResetComplexEntryList(pL2);
    // Move all nodes from T to pL1
    InsertComplexEntryList( pL1, T);
}
GenerateDNFForTree(pFilterExpNode)
{
    ComplexEntryList *pL, *pR;
    if(!pFilterExpNode)
        return;
    // Leaf node processing
    if(pFIlterExpNode->pRight==NULL)
    {
        ComplexEntryNode * pNode;
        // Allocate complex entry node and initialize node with
        // relational operation in pFilterExpNode.
        pNode = AllocComplexEntryNode(pFilterExpNode);
        // Left child
        if(pFilterExpNode->pParent->pLeft==pFilterExpNode)
            InsertComplexEntryNode( L, pNode);
        // Right child
        else
            InsertComplexEntryNode(R, pNode);
        return;
    }
    GenerateDNFForTree(pFilterExpNode->pLeft);
    GenerateDNFForTree(pFilterExpNode->pRight);
    // Non-leaf node processing
    if(pFilterExpNode->pLeft->pLeft==NULL)
        // Left node is leaf
        pL = &L;
    else
        // Left node is not leaf
        pL = &RL;
    if(pFilterExpNode->pRight->pLeft==NULL)
        // Right node is leaf
        pR = &R;
    else
        // Right node is not leaf
        pR = &RR;
    if(pFilterExpNode->op==OR)
    {
        // OR processing
        // Left child
        if(pParent==NULL ||
pFilterExpNode->pParent->pLeft==pFilterExpNode)
            ComputeOrOfComplexEntryLists( pL, pR);
        // Right child
        else
            ComputeOrOfComplexEntryLists( pR, pL);
    }
    else
    {
        // AND processing
        // Left child
        if(pParent==NULL ||
pFilterExpNode->pParent->pLeft==pFilterExpNode)
            ComputeAndOfComplexEntryLists( pL, pR);
        // Right child
        else
            ComputeAndOfComplexEntryLists( pR, pL);
    }
}
```

The result of the parser should be the DNF representation of the filter.

Post-Processing of the DNF Expression

At this point, the filter expression is in DNF; however, it cannot be inserted in the Patricia trees due to the following reasons. First, the key portion of the complex tree entry has a predefined set of fields where each field appears only once and can only be associated to a single relational operation and value. Second, Patricia trees do not support overlapping entries. Third, hardware assisted Patricia trees have a limited key and result size. In the case of the NP-3 the maximum key size is 38 Bytes and the maximum result size is 96 Bytes. Due to the size of the IPv6 addresses, the limited size of the key will most likely cause the 28 Byte key size to be exceeded when filtering on anything more than IP addresses and transport ports.

The complex tree entry has a predefined set of fields. Each field appears only once in the entry and can have any of the forms described above (range, wildcard, etc. . . . ). Once the DNF expression is obtained, some conjunctive clauses may have the same field with different types of values. When the same field appears more than once in a conjunctive clause, sometimes it is a valid expression and sometimes it is an incongruent expression. As a general rule, if the conjunctive clause is determined to be incongruent—i.e. it contradicts itself—the conjunctive clause can be ignored and a warning message can be sent to the user.

TABLE 9 describes how multiple relational operations with the same field can be interpreted when they are part of the same conjunctive clause.

TABLE 9

| RELATIONAL OPERATION X | RELATIONAL OPERATION Y | RESULT = X AND Y |
|---|---|---|
| A == K | A == L | If K != L: INVALID<br>If K == L: A == K |
| A == K | A != L | If K == L: INVALID<br>If K != L: A == K |
| A == K | A >= L | If K < L: INVALID<br>If K >= L: A == K |
| A == K | A > L | If K <= L: INVALID<br>If K > L: A == K |
| A == K | A <= L | If K > L: INVALID<br>If K <= L: A == K |
| A == K | A < L | If K >= L: INVALID<br>If K < L: A == K |
| A != K | A != L | If K == L: A != K<br>If K < L:<br>(A < K) OR<br>(A >= K+1 AND A <= L−1) (range) OR<br>(A > L)<br>If L < K:<br>(A < L) OR<br>(A >= L+1 AND A <= K−1) (range) OR<br>(A > K) |
| A != K | A >= L | If K < L: A >= L<br>If K == L: A > L<br>If K > L:<br>(A >= L AND A <= K−1) (range) OR<br>(A > K) |
| A != K | A > L | If K <= L: A > L<br>If K > L:<br>(A >= L+1 AND A <= K−1) (range) OR<br>(A > K) |
| A != K | A <= L | If K > L: A <= L<br>If K == L: A < L<br>If K < L:<br>(A < K) OR<br>(A >= K+1 AND A <= L) (range) |
| A != K | A < L | If K >= L: A < L<br>If K < L:<br>(A < K) OR<br>(A >= K+1 AND A <= L−1) (range) |

TABLE 9-continued

| RELATIONAL OPERATION X | RELATIONAL OPERATION Y | RESULT = X AND Y |
|---|---|---|
| A >= K | A >= L | If K == L: A >= K<br>If K > L: A >= K.<br>If L > K: A >= L |
| A >= K | A > L | If K == L: A > L<br>If K > L: A >= K.<br>If L > K: A > L |
| A >= K | A <= L | If K > L: INVALID<br>If K == L: A == K<br>If K < L:<br>A >= K AND A <= L (range) |
| A >= K | A < L | If K >= L: INVALID<br>If K < L:<br>A >= K AND A <= L−1 (range) |
| A > K | A > L | If K >= L: A > K<br>If L > K: A > L |
| A > K | A <= L | If K >= L: INVALID<br>If K < L:<br>A >= K+1 AND A <= L (range) |
| A > K | A < L | If K >= L: INVALID<br>If K < L:<br>A >= K+1 AND A <= L−1 (range) |
| A <= K | A <= L | If K <= L: A <= K<br>If K > L: A <= L |
| A <= K | A < L | If K == L: A < L<br>If K < L: A <= K<br>If L < K: A < L |
| A <= K | A <= L | If K <= L: A <= K<br>If K > L: A <= L |
| A <= K | A <= L | If K <= L: A <= K<br>If K > L: A <= L |
| A < K | A < L | If K <= L: A < K<br>If K > L: A < L |

The conversion described in TABLE 9 must be applied to each conjunctive clause where each field appears more that once and it cannot be interpreted as a single range. When the conversion table generates an expression that contains an OR operation as part of a conjunctive clause, this causes the creation of additional conjunctive clauses. New conjunctive clauses must be derived from conjunctive clauses that contain an OR operation after the conversion. This is illustrated in the following example:

Original conjunctive clause

F=A !=5 AND A!=7 AND A<8 AND B==10−

Expression after conversion is applied

F=[(A<5) OR (A==6) OR (A>7)] AND A<8 AND B==10

F=[(A<5 AND A<8) OR (A==6 AND A<8) OR (A>7 AND A<8)] AND B==10

F=[A<5 OR A==6] AND B==10

Final expression with two separate conjunctive clauses

F=(A<5 AND B==10) OR (A==6 AND B==10)

Every term of every conjunctive clause must be represented as a range of one or more values to facilitate resolving filter overlaps. To achieve this, the conversion described in TABLE 10 must be applied.

TABLE 10

| RELATIONAL OPERATION | EQUIVALENT RANGE REPRESENTATION |
|---|---|
| A == K | A == [K,K] |
| A >= K | A == [K,∞] |
| A > K | A == [K+1,∞] |
| A <= K | A == [0,K] |

TABLE 10-continued

| RELATIONAL OPERATION | EQUIVALENT RANGE REPRESENTATION |
|---|---|
| A < K | A == [0,K−1] |
| A != K | A == [0,K−1] OR A == [K+1,∞] |

NOTES:
1) This conversion is possible because values for all filtering fields are effectively positive integers.
2) Since the logical operator OR may appear again due to the conversion of the relational operator '!=', the algorithm described in bullet [0066] must be applied again to the expression.

Once the conversion described in the previous bullets is applied, we must make sure that the filter expression does not contain conjunctive clauses that are fully represented by another conjunctive clause. In this case the "subset" should be removed from the expressions since it is considered redundant.

Assuming keys={A, B, C, D}, where Ax∈A, Bx∈B, Cx∈C, Dx∈D, for any x, and F is a filter expression, where
F=X OR Y, and
X=[Ai,Aj]*[Bi,Bj]*[Ci,Cj]*[Di,Dj]], and
Y=[Ak,Al]*[Bk,Bl]*[Ck,Cl]*[Dk,Dl],
X is considered a subset of Y if and only if [Ai,Aj] is a subset of [Ak,Al], and [Bi,Bj] is a subset of [Bk,Bl], and [Ci,Cj] is a subset of [Ck,Cl] and [Di,Dj]] is a subset of [Dk,Dl]. If X is a subset of Y, X can be removed from the expression without affecting the result produced by filter F.

Inserting the DNF Expression into the Complex Trees

At this point that filter could be inserted into the Patricia as is, unless one of the following is true: 1) the size of the filter key exceeds the maximum size supported by the tree, or 2) more than one filter expression must be inserted into the as a completely separated filter, as in the case where two different users are snooping the network with two different filters. Since both these conditions are pretty common the following bullets will explain how to address these issues.

If the total size of the key exceeds the maximum size supported by the Patricia tree (38 bytes in the case of the NP3), two separate trees could be used for filtering. In order to do so the filter expression must be converted into an equivalent expression that only contains conjunctive clauses that do not overlap. In other words, Assuming keys={A, B, C, D}, where Ax∈A, Bx∈B, Cx∈C, Dx∈D, for any x, and X any Y are conjunctive clauses where,
X=[Ai,Aj]*[Bi,Bj]*[Ci,Cj]*[Di,Dj]],
Y=[Ak,Al]*[Bk,Bl]*[Ck,Cl]*[Dk,Dl]
X and Y are considered to overlap if and only if [Ai,Aj] overlaps [Ak,Al], and [Bi,Bj] overlaps [Bk,Bl], and [Ci,Cj] overlaps [Ck,Cl] and [Di,Dj]] overlaps [Dk,Dl].

In order to be able to insert a filter expression in DNF form into two separate trees we must transform the expression into an equivalent form that meets the following criteria:

Assuming we have filter expression F in DNF form, where
F=sum(Pi), for i=0 to n, and
Pi=[Ak,Al]*[Bk,Bl]*[Ck,Cl]*[Dk,Dl], and
None of the conjunctive clauses in F overlap with any other conjunctive clause in F.

In order to be able to split the filter the term information must be inserted into the trees. This limits the number of terms that can be allowed for each filter expression. For example, in the case of the NP3 that contains 96 Bytes of result, in order to support 8 different filter instances, the number of terms (n) would have to be <=88. If 16 different filter instances were supported the number of terms per filter expression would be reduced by half. By the same token, if only 4 filter instances were supported the supported number of terms per filter expression would double.

Once the filter has been transformed into a DNF expression with non-overlapping conjunctive clauses it can be inserted into the complex trees as explained by the following sections.

Given filter F0, where
F0=P1+P2, and
Keys={A, B, C, D}, where Ax∈A, Bx∈B, Cx∈C, Dx∈D, for any x, and
P1=[Ai,Aj]*[Bi,Bj]*[Ci,Cj]*[Di,Dj], and
P2=[Ak,Al]*[Bk,Bl]*[Ck,Cl]*[Dk,Dl]

Each conjunctive clause Pi will be given a unique identifier (ID) within the expression; the ID must be between 0 and n. In the case of this expression, the IDs for the conjunctive clauses are P0 and P1. Additionally, the expression itself has a system wide unique ID. Valid values are between 0 and m, where m is typically a small number.

Assume A and B belong in tree 1 (T1) and C and D belong in tree 2 (T2).

Each entry in T1 will contain the following:

| A | B | Result |
|---|---|---|
| [Ai,Aj] | [Bi,Bj] | F0,P1 |
| [Ak,Al] | [Bk,Bl] | F0,P2 |

Each entry in T2 will contain the following:

| C | D | Result |
|---|---|---|
| [Ci,Cj] | [Di,Dj] | F0,P1 |
| [Ck,Cl] | [Dk,Dl] | F0,P2 |

Given result R1 for T1 and R2 for T2, calculate final result R as follows:
R=R1 & R2, if R !=0 then there's a match.
TABLE 11 contains the possible outcomes for T1 and T2:

TABLE 11

| R1 | R2 | Result |
|---|---|---|
| F0,P1 | F0,P1 | Match |
| F0,P1 | F0,P2 | No Match |
| F0,P2 | F0,P1 | No match |
| F0,P2 | F0,P2 | Match |

Resolving Overlapping Conjunctive Clauses

Overlapping conjunctive clauses may be resolved as follows. Assuming conjunctive clauses P1 and P2 were obtained from different filters, where
P1=[Ai,Aj]*[Bi,Bj]*[Ci,Cj]*[Di,Dj] with result=F1P1 (filter 1, conjunctive clause 1)
P2=[Ak,Al]*[Bk,Bl]*[Ck,Cl]*[Dk,Dl] with result=F2P2 (filter 2, conjunctive clause 1)

The intersection of P1 and P2 must be obtained so it can be inserted as a separate conjunctive clause into T1 and T2. The intersection must contain result information for both P1 and P2.

The following Algorithm can be used to resolve the overlapping conjunctive clauses.
1) Determine intersection between [Ai,Aj] and [Ak,Al]. Assuming Aj=Ak+2, and Ai<Ak.
Calculate intersection between [Ai,Aj] and [Ak,Al]=[Ak, Ak+2]
Create non-overlapping sets that represent [Ai,Al] using intersection: [Ai,Ak−1], [Ak,Ak+2], and [Ak+3,Al].

Generate
P1=P11 or P12, and
P2=P21 or P22, where
P11=[Ai,Ak−1]*[Bi,Bj]*[Ci,Cj]*[Di,Dj], result F1P1
P12=[Ak,Ak+2]*[Bi,Bj]*[Ci,Cj]*[Di,Dj], result F1P1
P21=[Ak,Ak+2]*[Bk,Bl]*[Ck,Cl]*[Dk,Dl], result F2P1
P22=[Ak+3,Al]*[Bk,Bl]*[Ck,Cl]*[Dk,Dl], result F2P1

2) Repeat the same process with [Bi,Bj] and [Bk,Bl].
Assuming Bj=Bk+2, and Bi<Bk.
Calculate intersection between [Bi,Bj] and [Bk,Bl]=[Bk, Bk+2]
Non-overlapping sets that represent [Bi,Bl] using intersection: [Bi,Bk−1], [Bk,Bk+2], and [Bk+3,Bl].

Generate
P1=P111 or P112 or P121 or P122, and
P2=P211 or P212 or P221 or P222, where
P111=[Ai,Ak−1]*[Bi,Bk−1]*[Ci,Cj]*[Di,Dj], result F1P1
P112=[Ai,Ak−1]*[Bk,Bk+2]*[Ci,Cj]*[Di,Dj], result F1P1
P121=[Ak,Ak+2]*[Bi,Bk−1]*[Ci,Cj]*[Di,Dj], result F1P1
P122=[Ak,Ak+2]*[Bk,Bk+2]*[Ci,Cj]*[Di,Dj], result F1P1
P211=[Ak,Ak+2]*[Bk,Bk+2]*[Ck,Cl]*[Dk,Dl], result F2P1
P212=[Ak,Ak+2]*[Bk+3,Bl]*[Ck,Cl]*[Dk,Dl], result F2P1
P221=[Ak+3,Al]*[Bk,Bk+2]*[Ck,Cl]*[Dk,Dl], result F2P1
P222=[Ak+3,Al]*[Bk+3,Bl]*[Ck,Cl]*[Dk,Dl], result F2P1

3) Repeat the same process with [Ci,Cj] and [Ck,Cl].
Assuming Cj=Ck+2, and Ci<Ck.
Calculate intersection between [Ci,Cj] and [Ck,Cl]=[Ck, Ck+2]
Non-overlapping sets that represent [Ci,Cl] using intersection: [Ci,Ck−1], [Ck,Ck+2], and [Ck+3,Cl].

Generate
P1=P1111 or P1112 or P1121 or P1122 or P1211 or P1212 or P1221 or P1222, and
P2=P2111 or P2112 or P2121 or P2122 or P2211 or P2212 or P2221 or P2222, where
P1111=[Ai,Ak−1]*[Bi,Bk−1]*[Ci,Ck−1]*[Di,Dj], result F1P1
P1112=[Ai,Ak−1]*[Bi,Bk−1]*[Ck,Ck+2]*[Di,Dj], result F1P1
P1121=[Ai,Ak−1]*[Bk,Bk+2]*[Ci,Ck−1]*[Di,Dj], result F1P1
P1122=[Ai,Ak−1]*[Bk,Bk+2]*[Ck,Ck+2]*[Di,Dj], result F1P1
P1211=[Ak,Ak+2]*[Bi,Bk−1]*[Ci,Ck−1]*[Di,Dj], result F1P1
P1212=[Ak,Ak+2]*[Bi,Bk−1]*[Ck,Ck+2]*[Di,Dj], result F1P1
P1221=[Ak,Ak+2]*[Bk,Bk+2]*[Ci,Ck−1]*[Di,Dj], result F1P1
P1222=[Ak,Ak+2]*[Bk,Bk+2]*[Ck,Ck+2]*[Di,Dj], result F1P1
P2111=[Ak,Ak+2]*[Bk,Bk+2]*[Ck,Ck+2]*[Dk,Dl], result F2P1
P2112=[Ak,Ak+2]*[Bk,Bk+2]*[Ck+3,Cl]*[Dk,Dl], result F2P1
P2121=[Ak,Ak+2]*[Bk+3,Bl]*[Ck,Ck+2]*[Dk,Dl], result F2P1
P2122=[Ak,Ak+2]*[Bk+3,Bl]*[Ck+3,Cl]*[Dk,Dl], result F2P1

P2211=[Ak+3,Al]*[Bk,Bk+2]*[Ck,Ck+2]*[Dk,Dl], result F2P1

P2212=[Ak+3,Al]*[Bk,Bk+2]*[Ck+3,Cl]*[Dk,Dl], result F2P1

P2221=[Ak+3,Al]*[Bk+3,Bl]*[Ck,Ck+2]*[Dk,Dl], result F2P1

P2222=[Ak+3,Al]*[Bk+3,Bl]*[Ck+3,Cl]*[Dk,Dl], result F2P1

4) Repeat the same process with [Di,Dj] and [Dk,Dl]. Assuming Dj=Dk+2, and Di<Dk.

Calculate intersection between [Di,Dj] and [Dk,Dl]=[Dk, Dk+2]

Non-overlapping sets that represent [Di,Dl] using intersection: [Di,Dk−1], [Dk,Dk+2], and [Dk+3,Dl].

Generate

P1=P11111 or P11112 or P11121 or P11122 or P11211 or P11212 or P11221 or P11222 or P12111 or P12112 or P12121 or P12122 or P12211 or P12212 or P12221 or P12222, and P2=P21111 or P21112 or P21121 or P21122 or P21211 or P21212 or P21221 or P21222 or P22111 or P22112 or P22121 or P22122 or P22211 or P22212 or P22221 or P22222, where P11111=[Ai,Ak−1]*[Bi,Bk−1]*[Ci,Ck−1]*[Di,Dk−1], result F1P1

P11112=[Ai,Ak−1]*[Bi,Bk−1]*[Ci,Ck−1]*[Dk,Dk+2], result F1P1

P11121=[Ai,Ak−1]*[Bi,Bk−1]*[Ck,Ck+2]*[Di,Dk−1], result F1P1

P11122=[Ai,Ak−1]*[Bi,Bk−1]*[Ck,Ck+2]*[Dk,Dk+2], result F1P1

P11211=[Ai,Ak−1]*[Bk,Bk+2]*[Ci,Ck−1]*[Di,Dk−1], result F1P1

P11212=[Ai,Ak−1]*[Bk,Bk+2]*[Ci,Ck−1]*[Dk,Dk+2], result F1P1

P11221=[Ai,Ak−1]*[Bk,Bk+2]*[Ck,Ck+2]*[Di,Dk−1], result F1P1

P11222=[Ai,Ak−1]*[Bk,Bk+2]*[Ck,Ck+2]*[Dk,Dk+2], result F1P1

P12111=[Ak,Ak+2]*[Bi,Bk−1]*[Ci,Ck−1]*[Di,Dk−1], result F1P1

P12112=[Ak,Ak+2]*[Bi,Bk−1]*[Ci,Ck−1]*[Dk,Dk+2], result F1P1

P12121=[Ak,Ak+2]*[Bi,Bk−1]*[Ck,Ck+2]*[Di,Dk−1], result F1P1

P12122=[Ak,Ak+2]*[Bi,Bk−1]*[Ck,Ck+2]*[Dk,Dk+2], result F1P1

P12211=[Ak,Ak+2]*[Bk,Bk+2]*[Ci,Ck−1]*[Di,Dk−1], result F1P1

P12212=[Ak,Ak+2]*[Bk,Bk+2]*[Ci,Ck−1]*[Dk,Dk+2], result F1P1

P12221=[Ak,Ak+2]*[Bk,Bk+2]*[Ck,Ck+2]*[Di,Dk−1], result F1P1

P12222=[Ak,Ak+2]*[Bk,Bk+2]*[Ck,Ck+2]*[Dk,Dk+2], result F1P1

P21111=[Ak,Ak+2]*[Bk,Bk+2]*[Ck,Ck+2]*[Dk,Dk+2], result F2P1

P21112=[Ak,Ak+2]*[Bk,Bk+2]*[Ck,Ck+2]*[Dk+3,Dl], result F2P1

P21121=[Ak,Ak+2]*[Bk,Bk+2]*[Ck+3,Cl]*[Dk,Dk+2], result F2P1

P21122=[Ak,Ak+2]*[Bk,Bk+2]*[Ck+3,Cl]*[Dk+3,Dl], result F2P1

P21211=[Ak,Ak+2]*[Bk+3,Bl]*[Ck,Ck+2]*[Dk,Dk+2], result F2P1

P21212=[Ak,Ak+2]*[Bk+3,Bl]*[Ck,Ck+2]*[Dk+3,Dl], result F2P1

P21221=[Ak,Ak+2]*[Bk+3,Bl]*[Ck+3,Cl]*[Dk,Dk+2], result F2P1

P21222=[Ak,Ak+2]*[Bk+3,Bl]*[Ck+3,Cl]*[Dk+3,Dl], result F2P1

P22111=[Ak+3,Al]*[Bk,Bk+2]*[Ck,Ck+2]*[Dk,Dk+2], result F2P1

P22112=[Ak+3,Al]*[Bk,Bk+2]*[Ck,Ck+2]*[Dk+3,Dl], result F2P1

P22121=[Ak+3,Al]*[Bk,Bk+2]*[Ck+3,Cl]*[Dk,Dk+2], result F2P1

P22122=[Ak+3,Al]*[Bk,Bk+2]*[Ck+3,Cl]*[Dk+3,Dl], result F2P1

P22211=[Ak+3,Al]*[Bk+3,Bl]*[Ck,Ck+2]*[Dk,Dk+2], result F2P1

P22212=[Ak+3,Al]*[Bk+3,Bl]*[Ck,Ck+2]*[Dk+3,Dl], result F2P1

P22221=[Ak+3,Al]*[Bk+3,Bl]*[Ck+3,Cl]*[Dk,Dk+2], result F2P1

P22222=[Ak+3,Al]*[Bk+3,Bl]*[Ck+3,Cl]*[Dk+3,Dl], result F2P1

5) Identify intersection between P1 and P2. The intersection will be a conjunctive clause that exists both in P1 and P2. In the example, P12222 and P21111 represent the intersection since they are identical, therefore their results can be combined.

Generate

P3=P12222, result F1P1 F2P1, and

P1-P3=P11111 or P11112 or P11121 or P11122 or P11211 or P11212 or P11221 or P11222 or P12111 or P12112 or P12121 or P12122 or P12211 or P12212 or P12221 and P2-P3=P21112 or P21121 or P21122 or P21211 or P21212 or P21221 or P21222 or P22111 or P22112 or P22121 or P22122 or P22211 or P22212 or P22221 or P22222, where P11111=[Ai,Ak−1]*[Bi,Bk−1]*[Ci,Ck−1]*[Di,Dk−1], result F1P1

P11112=[Ai,Ak−1]*[Bi,Bk−1]*[Ci,Ck−1]*[Dk,Dk+2], result F1P1

P11121=[Ai,Ak−1]*[Bi,Bk−1]*[Ck,Ck+2]*[Di,Dk−1], result F1P1

P11122=[Ai,Ak−1]*[Bi,Bk−1]*[Ck,Ck+2]*[Dk,Dk+2], result F1P1

P11211=[Ai,Ak−1]*[Bk,Bk+2]*[Ci,Ck−1]*[Di,Dk−1], result F1P1

P11212=[Ai,Ak−1]*[Bk,Bk+2]*[Ci,Ck−1]*[Dk,Dk+2], result F1P1

P11221=[Ai,Ak−1]*[Bk,Bk+2]*[Ck,Ck+2]*[Di,Dk−1], result F1P1

P11222=[Ai,Ak−1]*[Bk,Bk+2]*[Ck,Ck+2]*[Dk,Dk+2], result F1P1

P12111=[Ak,Ak+2]*[Bi,Bk−1]*[Ci,Ck−1]*[Di,Dk−1], result F1P1

P12112=[Ak,Ak+2]*[Bi,Bk−1]*[Ci,Ck−1]*[Dk,Dk+2], result F1P1

P12121=[Ak,Ak+2]*[Bi,Bk−1]*[Ck,Ck+2]*[Di,Dk−1], result F1P1

P12122=[Ak,Ak+2]*[Bi,Bk−1]*[Ck,Ck+2]*[Dk,Dk+2], result F1P1

P12211=[Ak,Ak+2]*[Bk,Bk+2]*[Ci,Ck−1]*[Di,Dk−1], result F1P1

P12212=[Ak,Ak+2]*[Bk,Bk+2]*[Ci,Ck−1]*[Dk,Dk+2], result F1P1

P12221=[Ak,Ak+2]*[Bk,Bk+2]*[Ck,Ck+2]*[Di,Dk−1], result F1P1

P12222=[Ak,Ak+2]*[Bk,Bk+2]*[Ck,Ck+2]*[Dk,Dk+2], result F1P1 F2P1

P21112=[Ak,Ak+2]*[Bk,Bk+2]*[Ck,Ck+2]*[Dk+3,Dl], result F2P1
P21121=[Ak,Ak+2]*[Bk,Bk+2]*[Ck+3,Cl]*[Dk,Dk+2], result F2P1
P21122=[Ak,Ak+2]*[Bk,Bk+2]*[Ck+3,Cl]*[Dk+3,Dl], result F2P1
P21211=[Ak,Ak+2]*[Bk+3,Bl]*[Ck,Ck+2]*[Dk,Dk+2], result F2P1
P21212=[Ak,Ak+2]*[Bk+3,Bl]*[Ck,Ck+2]*[Dk+3,Dl], result F2P1
P21221=[Ak,Ak+2]*[Bk+3,Bl]*[Ck+3,Cl]*[Dk,Dk+2], result F2P1
P21222=[Ak,Ak+2]*[Bk+3,Bl]*[Ck+3,Cl]*[Dk+3,Dl], result F2P1
P22111=[Ak+3,Al]*[Bk,Bk+2]*[Ck,Ck+2]*[Dk,Dk+2], result F2P1
P22112=[Ak+3,Al]*[Bk,Bk+2]*[Ck,Ck+2]*[Dk+3,Dl], result F2P1
P22121=[Ak+3,Al]*[Bk,Bk+2]*[Ck+3,Cl]*[Dk,Dk+2], result F2P1
P22122=[Ak+3,Al]*[Bk,Bk+2]*[Ck+3,Cl]*[Dk+3,Dl], result F2P1
P22211=[Ak+3,Al]*[Bk+3,Bl]*[Ck,Ck+2]*[Dk,Dk+2], result F2P1
P22212=[Ak+3,Al]*[Bk+3,Bl]*[Ck,Ck+2]*[Dk+3,Dl], result F2P1
P22221=[Ak+3,Al]*[Bk+3,Bl]*[Ck+3,Cl]*[Dk,Dk+2], result F2P1
P22222=[Ak+3,Al]*[Bk+3,Bl]*[Ck+3,Cl]*[Dk+3,Dl], result F2P1

6) Once the intersection has been identified and removed from the original conjunctive clause, the expanded conjunctive clauses must be reduced as much as possible. Starting with the last set of keys expanded [Di,Dj] and [Dk,Dl], check all conjunctive clauses with overlaps and combine when possible.
Generate
P3=P12222, result F1P1 F2P1, and
P1-P3=P1111 or P1112 or P1121 or P1122 or P1211 or P1212 or P1221 or P12221, and
P2-P3=P21112 or P2112 or P2121 or P2122 or P2211 or P2212 or P2221 or P2222, where
P1111=[Ai,Ak-1]*[Bi,Bk-1]*[Ci,Ck-1]*[Di,Dk+2], result F1P1
P1112=[Ai,Ak-1]*[Bi,Bk-1]*[Ck,Ck+2]*[Di,Dk+2], result F1P1
P1121=[Ai,Ak-1]*[Bk,Bk+2]*[Ci,Ck-1]*[Di,Dk+2], result F1P1
P1122=[Ai,Ak-1]*[Bk,Bk+2]*[Ck,Ck+2]*[Di,Dk+2], result F1P1
P1211=[Ak,Ak+2]*[Bi,Bk-1]*[Ci,Ck-1]*[Di,Dk+2], result F1P1
P1212=[Ak,Ak+2]*[Bi,Bk-1]*[Ck,Ck+2]*[Di,Dk+2], result F1P1
P1221=[Ak,Ak+2]*[Bk,Bk+2]*[Ci,Ck-1]*[Di,Dk+2], result F1P1
P12221=[Ak,Ak+2]*[Bk,Bk+2]*[Ck,Ck+2]*[Di,Dk-1], result F1P1
P12222=[Ak,Ak+2]*[Bk,Bk+2]*[Ck,Ck+2]*[Dk,Dk+2], result F1P1 F2P1
P21112=[Ak,Ak+2]*[Bk,Bk+2]*[Ck,Ck+2]*[Dk+3,Dl], result F2P1
P2112=[Ak,Ak+2]*[Bk,Bk+2]*[Ck+3,Cl]*[Dk,Dl], result F2P1
P2121=[Ak,Ak+2]*[Bk+3,Bl]*[Ck,Ck+2]*[Dk,Dl], result F2P1
P2122=[Ak,Ak+2]*[Bk+3,Bl]*[Ck+3,Cl]*[Dk,Dl], result F2P1
P2211=[Ak+3,Al]*[Bk,Bk+2]*[Ck,Ck+2]*[Dk,Dl], result F2P1
P2212=[Ak+3,Al]*[Bk,Bk+2]*[Ck+3,Cl]*[Dk,Dl], result F2P1
P2221=[Ak+3,Al]*[Bk+3,Bl]*[Ck,Ck+2]*[Dk,Dl], result F2P1
P2222=[Ak+3,Al]*[Bk+3,Bl]*[Ck+3,Cl]*[Dk,Dl], result F2P1

7) Continue with next set of keys expanded [Ci,Cj] and [Ck,Cl]. Check all conjunctive clauses with overlaps and combine when possible.
Generate
P3=P12222, result F1P1 F2P1, and
P1-P3=P111 or P112 or P121 or P1221 or P12221 and
P2-P3=P21112 or P2112 or P212 or P221 or P222, where
P111=[Ai,Ak-1]*[Bi,Bk-1]*[Ci,Ck+2]*[Di,Dk+2], result F1P1
P112=[Ai,Ak-1]*[Bk,Bk+2]*[Ci,Ck+2]*[Di,Dk+2], result F1P1
P121=[Ak,Ak+2]*[Bi,Bk-1]*[Ci,Ck+2]*[Di,Dk+2], result F1P1
P1221=[Ak,Ak+2]*[Bk,Bk+2]*[Ci,Ck-1]*[Di,Dk+2], result F1P1
P12221=[Ak,Ak+2]*[Bk,Bk+2]*[Ck,Ck+2]*[Di,Dk-1], result F1P1
P12222=[Ak,Ak+2]*[Bk,Bk+2]*[Ck,Ck+2]*[Dk,Dk+2], result F1P1 F2P1
P21112=[Ak,Ak+2]*[Bk,Bk+2]*[Ck,Ck+2]*[Dk+3,Dl], result F2P1
P2112=[Ak,Ak+2]*[Bk,Bk+2]*[Ck+3,Cl]*[Dk,Dl], result F2P1
P212=[Ak,Ak+2]*[Bk+3,Bl]*[Ck,Cl]*[Dk,Dl], result F2P1
P221=[Ak+3,Al]*[Bk,Bk+2]*[Ck,Cl]*[Dk,Dl], result F2P1
P222=[Ak+3,Al]*[Bk+3,Bl]*[Ck,Cl]*[Dk,Dl], result F2P1

8) Continue with next set of keys expanded [Bi,Bj] and [Bk,Bl]. Check all conjunctive clauses with overlaps and combine when possible.
Generate
P3=P12222, result F1P1 F2P1, and
P1-P3=P11 or P121 or P1221 or P12221, and
P2-P3=P21112 or P2112 or P212 or P22, where
P11=[Ai,Ak-1]*[Bi,Bk+2]*[Ci,Ck+2]*[Di,Dk+2], result F1P1
P121=[Ak,Ak+2]*[Bi,Bk-1]*[Ci,Ck+2]*[Di,Dk+2], result F1P1
P1221=[Ak,Ak+2]*[Bk,Bk+2]*[Ci,Ck-1]*[Di,Dk+2], result F1P1
P12221=[Ak,Ak+2]*[Bk,Bk+2]*[Ck,Ck+2]*[Di,Dk-1], result F1P1
P12222=[Ak,Ak+2]*[Bk,Bk+2]*[Ck,Ck+2]*[Dk,Dk+2], result F1P1 F2P1
P21112=[Ak,Ak+2]*[Bk,Bk+2]*[Ck,Ck+2]*[Dk+3,Dl], result F2P1
P2112=[Ak,Ak+2]*[Bk,Bk+2]*[Ck+3,Cl]*[Dk,Dl], result F2P1
P212=[Ak,Ak+2]*[Bk+3,Bl]*[Ck,Cl]*[Dk,Dl], result F2P1
P22=[Ak+3,Al]*[Bk,Bl]*[Ck,Cl]*[Dk,Dl], result F2P1

9) Continue with next set of keys expanded [Ai,Aj] and [Ak,Al]. Check all conjunctive clauses with overlaps and combine when possible. At this point expressions cannot be combined any further.

10) Final expression:
P1-P3=P11 or P121 or P1221 or P12221
P2-P3=P21112 or P2112 or P212 or P22
P3=P12222, result F1P1 F2P1
P11=[Ai,Ak−1]*[Bi,Bk+2]*[Ci,Ck+2]*[Di,Dk+2], result F1P1
P121=[Ak,Ak+2]*[Bi,Bk−1]*[Ci,Ck+2]*[Di,Dk+2], result F1P1
P1221=[Ak,Ak+2]*[Bk,Bk+2]*[Ci,Ck−1]*[Di,Dk+2], result F1P1
P12221=[Ak,Ak+2]*[Bk,Bk+2]*[Ck,Ck+2]*[Di,Dk−1], result F1P1
P12222=[Ak,Ak+2]*[Bk,Bk+2]*[Ck,Ck+2]*[Dk,Dk+2], result F1P1 F2P1
P21112=[Ak,Ak+2]*[Bk,Bk+2]*[Ck,Ck+2]*[Dk+3,Dl], result F2P1
P2112=[Ak,Ak+2]*[Bk,Bk+2]*[Ck+3,Cl]*[Dk,Dl], result F2P1
P212=[Ak,Ak+2]*[Bk+3,Bl]*[Ck,Cl]*[Dk,Dl], result F2P1
P22=[Ak+3,Al]*[Bk,Bl]*[Ck,Cl]*[Dk,Dl], result F2P1

Proof of Concept

As a proof of concept, one can prove that
P1=[Ai,Aj]*[Bi,Bj]*[Ci,Cj]*[Di,Dj] with result=F1P1 (filter 1, conjunctive clause 1)
P2=[Ak,Al]*[Bk,Bl]*[Ck,Cl]*[Dk,Dl] with result=F2P1 (filter 2, conjunctive clause 1) is equivalent to
P1-P3=P11 or P121 or P1221 or P12221, result F1P1 (filter 1, conjunctive clause 1)
P2-P3=P21112 or P2112 or P212 or P22, result F2P1 (filter 2, conjunctive clause 1)
P3=P12222, result F1P1 F2P1 (filter 1 conjunctive clause 1 and filter 2 conjunctive clause 1)

Given that
Aj=Ak+2
Bj=Bk+2
Cj=Ck+2
Dj=Dk+2 and
P11=[Ai,Ak−1]*[Bi,Bk+2]*[Ci,Ck+2]*[Di,Dk+2], result F1P1
P121=[Ak,Ak+2]*[Bi,Bk−1]*[Ci,Ck+2]*[Di,Dk+2], result F1P1
P1221=[Ak,Ak+2]*[Bk,Bk+2]*[Ci,Ck−1]*[Di,Dk+2], result F1P1
P12221=[Ak,Ak+2]*[Bk,Bk+2]*[Ck,Ck+2]*[Di,Dk−1], result F1P1
P12222=[Ak,Ak+2]*[Bk,Bk+2]*[Ck,Ck+2]*[Dk,Dk+2], result F1P1 F2P1
P21112=[Ak,Ak+2]*[Bk,Bk+2]*[Ck,Ck+2]*[Dk+3,Dl], result F2P1
P2112=[Ak,Ak+2]*[Bk,Bk+2]*[Ck+3,Cl]*[Dk,Dl], result F2P1
P212=[Ak,Ak+2]*[Bk+2,Bl]*[Ck,Cl]*[Dk,Dl], result F2P1
P22=[Ak+3,Al]*[Bk,Bl]*[Ck,Cl]*[Dk,Dl], result F2P1

1) Prove P1=(P1-P3)+P3
[Ai,Aj]*[Bi,Bj]*[Ci,Cj]*[Di,Dj], result F1P1=
P11=[Ai,Aj−3]*[Bi,Bj]*[Ci,Cj]*[Di,Dj], result F1P1
P121=[Aj−2,Aj]*[Bi,Bj−3]*[Ci,Cj]*[Di,Dj], result F1P1
P1221=[Aj−2,Aj]*[Bj−2,Bj]*[Ci,Cj−3]*[Di,Dj], result F1P1
P12221=[Aj−2,Aj]*[Bj−2,Bj]*[Cj−2,j]*[Di,Dj−3], result F1P1
P3=P12222=[Ak,Ak+2]*[Bk,Bk+2]*[Ck,Ck+2]*[Dk, Dk+2], result F1P1

Given that
Aj=Ak+2
Bj=Bk+2
Cj=Ck+2
Dj=Dk+2
P3=P12222=[Aj−2,Aj]*[Bj−2,Bj]*[Cj−2,Cj]*[Dj−2,Dj], result F1P1

Applying same reduction algorithm as before, starting with [Di,Dj]:
P11=[Ai,Aj−3]*[Bi,Bj]*[Ci,Cj]*[Di,Dj], result F1P1
P121=[Aj−2,Aj]*[Bi,Bj−3]*[Ci,Cj]*[Di,Dj], result F1P1
P1221=[Aj−2,Aj]*[Bj−2,Bj]*[Ci,Cj−3]*[Di,Dj], result F1P1
P1222=[Aj−2,Aj]*[Bj−2,Bj]*[Cj−2,j]*[Di,Dj], result F1P1

Continue with [Ci,Cj]:
P11=[Ai,Aj−3]*[Bi,Bj]*[Ci,Cj]*[Di,Dj], result F1P1
P121=[Aj−2,Aj]*[Bi,Bj−3]*[Ci,Cj]*[Di,Dj], result F1P1
P122=[Aj−2,Aj]*[Bj−2,Bj]*[Ci,Cj]*[Di,Dj], result F1P1

Continue with [Bi,Bj]:
P11=[Ai,Aj−3]*[Bi,Bj]*[Ci,Cj]*[Di,Dj], result F1P1
P12=[Aj−2,Aj]*[Bi,Bj]*[Ci,Cj]*[Di,Dj], result F1P1

End with [Ai,Aj]:
P1=[Ai,Aj]*[Bi,Bj]*[Ci,Cj]*[Di,Dj], result F1P1

2) Prove P2=(P2-P3)+P3
P2=[Ak,Al]*[Bk,Bl]*[Ck,Cl]*[Dk,Dl], result F2P1=
P3=P21111=[Ak,Ak+2]*[Bk,Bk+2]*[Ck,Ck+2]*[Dk, Dk+2], result F2P1
P21112=[Ak,Ak+2]*[Bk,Bk+2]*[Ck,Ck+2]*[Dk+3,Dl], result F2P1
P2112=[Ak,Ak+2]*[Bk,Bk+2]*[Ck+3,Cl]*[Dk,Dl], result F2P1
P212=[Ak,Ak+2]*[Bk+3,Bl]*[Ck,Cl]*[Dk,Dl], result F2P1
P22=[Ak+3,Al]*[Bk,Bl]*[Ck,Cl]*[Dk,Dl], result F2P1

Applying same reduction algorithm as before, starting with [Dk,Dl]:
P2111=[Ak,Ak+2]*[Bk,Bk+2]*[Ck,Ck+2]*[Dk,Dl], result F2P1
P2112=[Ak,Ak+2]*[Bk,Bk+2]*[Ck+3,Cl]*[Dk,Dl], result F2P1
P212=[Ak,Ak+2]*[Bk+3,Bl]*[Ck,Cl]*[Dk,Dl], result F2P1
P22=[Ak+3,Al]*[Bk,Bl]*[Ck,Cl]*[Dk,Dl], result F2P1

Continue with [Ck,Cl]:
P211=[Ak,Ak+2]*[Bk,Bk+2]*[Ck,Cl]*[Dk,Dl], result F2P1
P212=[Ak,Ak+2]*[Bk+3,Bl]*[Ck,Cl]*[Dk,Dl], result F2P1
P22=[Ak+3,Al]*[Bk,Bl]*[Ck,Cl]*[Dk,Dl], result F2P1

Continue with [Bk,Bl]:
P21=[Ak,Ak+2]*[Bk,Bl]*[Ck,Cl]*[Dk,Dl], result F2P1
P22=[Ak+3,Al]*[Bk,Bl]*[Ck,Cl]*[Dk,Dl], result F2P1

Finish with [Ak,Al]:
P2=[Ak,Al]*[Bk,Bl]*[Ck,Cl]*[Dk,Dl], result F2P1

Many modifications and other embodiments of the invention will come to mind to one skilled in the art to which this invention pertains having the benefit of the teachings presented in the foregoing descriptions, and the associated drawings. Therefore, it is to be understood that the invention is not to be limited to the specific embodiments disclosed. Although specific terms are employed herein, they are used in a generic and descriptive sense only and not for purposes of limitation.

What is claimed is:

1. A method, comprising:
defining an operator stack in a memory, the operator stack adapted to store binary logical operators;
defining a value stack in the memory, the value stack adapted to contain pointers to nodes of a filter expression tree;
parsing the filter expression on an element-by-element basis, elements of the filter expression comprising operators and values, wherein for each next element in the filter expression:
if the next element in the filter expression is a value, then adding the value to the value stack; and
if the next element in the filter expression is an operator, then comparing the next element to a top element in the operator stack, and performing an action defined a decision table based upon the next element and the top element;
removing a completed binary tree from the value stack;
defining stacks in a memory corresponding to a left sub-tree stack (L-stack), a right sub-tree stack (R-stack), a result of left sub-tree stack (RL-stack), and a result of right sub-tree stack (RR-stack);
performing a post-order traversal of the nodes of the completed binary tree in which each node of completed binary tree is visited, wherein during the post-order traversal:
if a node is a leaf node, then insert the operation allocated to the leaf node to the L-stack if the leaf node is a left child or insert the operation allocated to the leaf node to the R-stack if the leaf node is a right child; and
if the node is a non-leaf node, then processing the non-leaf node based upon whether the operation contains an OR operation or an AND operation, wherein the processing moves data into the RL-stack or the RR-stack;
processing a root node of the binary tree;
removing the disjunctive normal form of the filter expression from the RL-stack or the RR-stack corresponding to the root node; and
identifying overlapping keys from the disjunctive normal form of the filter expression.

2. The method of claim 1, further comprising:
if the non-leaf node contains an OR operation and children nodes of the non-leaf node are leaf nodes, then:
moving all nodes from the R-stack and L-stack into the RL-stack if the non-leaf node is a left child; or
moving all nodes from the R-stack and L-stack into the RR-stack if the non-leaf node is a right child.

3. The method of claim 1, further comprising:
if the non-leaf node contains an OR operation and children nodes of the non-leaf node are not leaf nodes, then:
moving all nodes from the RR-stack and the RL-stack into the RL-stack if the non-leaf node is a left child, or
moving all nodes from the RR-stack and the RL-stack into the RR-stack if the non-leaf node is a right child.

4. The method of claim 1, further comprising:
if the non-leaf node contains an AND operation and children nodes of the non-leaf node are leaf nodes, then:
combining every node in the R-stack with every node in the L-stack to create a single conjunctive clause.

5. The method of claim 4, further comprising:
inserting the single conjunctive clause into the RL-stack if the non-leaf node is a left child; or
inserting the single conjunctive clause into the RR-stack if the non-leaf node is a right child.

6. The method of claim 1, wherein the root node is treated as a left child during the processing.

7. A non-transistory computer-readable storage medium having program instructions stored thereon that, upon execution by a processor within a computer system, cause the computer system to:
define an operator stack in a memory, the operator stack adapted to store binary logical operators;
define a value stack in the memory, the value stack adapted to contain pointers to nodes of a filter expression tree;
parse the filter expression on an element-by-element basis, elements of the filter expression comprising operators and values, wherein for each next element in the filter expression:
if the next element in the filter expression is a value, then add the value to the value stack; and
if the next element in the filter expression is an operator, then compare the next element to a top element in the operator stack, and perform an action defined a decision table based upon the next element and the top element;
remove a completed binary tree from the value stack;
define stacks in a memory corresponding to a left sub-tree stack (L-stack), a right sub-tree stack (R-stack), a result of left sub-tree stack (RL-stack), and a result of right sub-tree stack (RR-stack);
perform a post-order traversal of the nodes of the completed binary tree in which each node of completed binary tree is visited, wherein during the post-order traversal:
if a node is a leaf node, then insert the operation allocated to the leaf node to the L-stack if the leaf node is a left child or insert the operation allocated to the leaf node to the R-stack if the leaf node is a right child; and
if the node is a non-leaf node, then process the non-leaf node based upon whether the operation contains an OR operation or an AND operation, wherein the processing moves data into the RL-stack or the RR-stack;
process a root node of the binary tree;
remove the disjunctive normal form of the filter expression from the RL-stack or the RR-stack corresponding to the root node; and
identify overlapping keys from the disjunctive normal form of the filter expression.

8. The non-transistory computer-readable storage medium of claim 7, wherein the program instructions, upon execution by the processor, further cause the computer system to:
(a) if the non-leaf node contains an OR operation and children nodes of the non-leaf node are leaf nodes, then:
move all nodes from the R-stack and L-stack into the RL-stack if the non-leaf node is a left child, or
move all nodes from the R-stack and L-stack into the RR-stack if the non-leaf node is a right child;
(b) if the non-leaf node contains an OR operation and children nodes of the non-leaf node are not leaf nodes, then:
move all nodes from the RR-stack and the RL-stack into the RL-stack if the non-leaf node is a left child, or
move all nodes from the RR-stack and the RL-stack into the RR-stack if the non-leaf node is a right child; or
(c) if the non-leaf node contains an AND operation and children nodes of the non-leaf node are leaf nodes, then:
combine every node in the R-stack with every node in the L-stack to create a single conjunctive clause,
insert the single conjunctive clause into the RL-stack if the non-leaf node is a left child, or insert the single conjunctive clause into the RR-stack if the non-leaf node is a right child.

9. The non-transitory computer-readable storage medium of claim 7, wherein the program instructions, upon execution by the processor, further cause the computer system to:

remove all NOT operations from nodes of the completed binary tree.

* * * * *